US010003157B2

(12) United States Patent
Yeon

(10) Patent No.: US 10,003,157 B2
(45) Date of Patent: Jun. 19, 2018

(54) SERVICE PLUG UNIT, DEVICE UNIT, AND POWER CUTTING-OFF SYSTEM FOR ELECTRIC CAR COMPRISING SAME

(71) Applicant: LS EV KOREA LTD., Gunpo-si, Gyeonggi-do (KR)

(72) Inventor: Kyu-Yeon Yeon, Seoul (KR)

(73) Assignee: LS EV KOREA LTD., Gunpo-si, Gyeonggi-do (KR)

(*) Notice: Subject to any disclaimer, the term of this patent is extended or adjusted under 35 U.S.C. 154(b) by 27 days.

(21) Appl. No.: 15/303,907

(22) PCT Filed: Jul. 2, 2014

(86) PCT No.: PCT/KR2014/005896
§ 371 (c)(1),
(2) Date: Oct. 13, 2016

(87) PCT Pub. No.: WO2015/160037
PCT Pub. Date: Oct. 22, 2015

(65) Prior Publication Data
US 2017/0047681 A1     Feb. 16, 2017

(30) Foreign Application Priority Data
Apr. 14, 2014   (KR) .......................... 10-2014-0044066

(51) Int. Cl.
*H01R 13/52*     (2006.01)
*H01R 13/629*     (2006.01)
(Continued)

(52) U.S. Cl.
CPC .......... *H01R 13/62955* (2013.01); *B60L 3/04* (2013.01); *B60L 11/1818* (2013.01);
(Continued)

(58) Field of Classification Search
CPC .......... H01R 13/62955; H01R 13/5202; H01R 13/62938; H01R 2201/26; B60L 3/04; B60L 11/1818; B60L 2270/145
(Continued)

(56) References Cited

U.S. PATENT DOCUMENTS 8,379,375 B2 *   2/2013   Furuya ................. B60L 3/0069
                                                 200/17 R
9,048,036 B2 *   6/2015   Kikuchi .................. H01H 9/26
(Continued)

FOREIGN PATENT DOCUMENTS

CN          102916298 A      2/2013
CN          103140906 A      6/2013
(Continued)

OTHER PUBLICATIONS

International Search Report for PCT/KR2014/005896 dated Jan. 9, 2015 from Korean Intellectual Property Office.
(Continued)

*Primary Examiner* — Khiem Nguyen
(74) *Attorney, Agent, or Firm* — Paratus Law Group, PLLC

(57) ABSTRACT

The inventive concept relates to a service plug unit capable of stably maintaining shielding performance even during vibration of a vehicle, safely cutting off high voltage/current power, and preventing an unintended power cut-off caused by an external force such as vibration, a device unit, and a power cutting-off system for use in an electric car and including the same.

13 Claims, 14 Drawing Sheets

(51) Int. Cl.
*B60L 3/04* (2006.01)
*B60L 11/18* (2006.01)
(52) U.S. Cl.
CPC ... *H01R 13/5202* (2013.01); *H01R 13/62938* (2013.01); *B60L 2270/145* (2013.01); *H01R 2201/26* (2013.01)
(58) Field of Classification Search
USPC .......................................... 439/157, 271, 272
See application file for complete search history.

(56) References Cited

U.S. PATENT DOCUMENTS

| | | |
|---|---|---|
| 2012/0279834 A1 | 11/2012 | Furuya et al. |
| 2013/0035004 A1 | 2/2013 | Ikeda et al. |
| 2013/0161176 A1 | 6/2013 | Kikuchi et al. |

FOREIGN PATENT DOCUMENTS

| | | |
|---|---|---|
| JP | 2012-079430 A | 4/2012 |
| JP | 2012-079644 A | 4/2012 |
| JP | 2012-186074 A | 9/2012 |
| KR | 10-2010-0138072 A | 12/2010 |
| KR | 10-2012-0097780 A | 9/2012 |
| WO | WO 2011/010793 A2 | 1/2011 |

OTHER PUBLICATIONS

Chinese Office Action for related CN Application No. 201480078373.9 dated Mar. 22, 2018 from Chinese Patent Office.

* cited by examiner (a)

(a)

SERVICE PLUG UNIT, DEVICE UNIT, AND POWER CUTTING-OFF SYSTEM FOR ELECTRIC CAR COMPRISING SAME

CROSS REFERENCE TO PRIOR APPLICATIONS

This application is a National Stage Patent Application of PCT International Patent Application No. PCT/KR2014/005896 (filed on Jul. 2, 2014) under 35 U.S.C. § 371, which claims priority to Korean Patent Application No. 10-2014-0044066 (filed on Apr. 14, 2014), which are all hereby incorporated by reference in their entirety.

TECHNICAL FIELD

The inventive concept relates to a service plug unit, a device unit, and a power cutting-off system for use in an electric car and including the same. More particularly, the inventive concept relates to a service plug unit capable of stably maintaining shielding performance even during vibration of a vehicle, safely cutting off high voltage/current power, and preventing an unintended power cut-off caused by an external force such as vibration, a device unit, and a power cutting-off system for use in an electric car and including the same.

BACKGROUND ART

In general, an electric car (or an electric automobile) or an electric vehicle (EV) means a vehicle using an electric battery and an electric motor instead of oil fuel and an engine.

Electric cars driven by rotating a motor by electric power accumulated in a battery were not put to practical use due to the heavy weight of the battery, a long charging time, etc. However, as environmental problems caused by pollution are becoming serious, electric cars are being developed from the 1990's. Recently, the global electric car market has rapidly grown and research has been actively conducted thereon.

In order to safely manage and handle a high-voltage battery or a high-capacity battery for use in electric cars, hybrid vehicles, etc., safety measures such as a control method and a physical method thereof are needed.

Among safety devices, a power cutting-off system for an electric car is a manual service disconnector (MSD) which is a system capable of selectively cutting off battery power to be supplied to an electric car according to the physical method.

That is, the MSD is capable of physically cutting off high-voltage battery power and is called variously according to a manufacturer thereof, e.g., a safety plug, a service plug, a disconnect switch, etc.

The MSD is used to prevent safety accidents from occurring during the manufacture, assembly, repair, delivery, etc. of an electric car. The MSD should be manufactured, whereby a user can easily cut off battery power, water-tightness is secured, a plug is not completely removed to prevent penetration of foreign substances while battery power is cut off when a high-voltage battery is delivered or needs to be repaired or a service thereof is needed, and other user convenience is secured.

The MSD should also have a shielding function to prevent interference with electronic components. Earthing should be maintained regardless of an external force caused by various vibrations occurring during driving of an electric car so as to stably maintain shielding performance.

Furthermore, when a plug is separated, sparks may be generated due to high voltage and thus safety problems may occur. Thus, measures should be taken therefor and the plug should be prevented from being arbitrarily separated due to an external force such as vibration.

Accordingly, there is a growing need for a power cutting-off system for an electric car, which is capable of stably maintaining shielding performance even during vibration of a vehicle, safely cutting off high voltage/current power, and preventing an unintended power cut-off caused by an external force such as vibration.

DETAILED DESCRIPTION OF THE INVENTIVE CONCEPT

Technical Problem

The inventive concept provides a service plug unit, whereby high-voltage power is cut off and a plug is separated at different times to prevent the occurrence of sparks caused by high voltage when the plug is separated, power is prevented from being arbitrarily cut off due to unintended separation of the plug or a terminal, caused by an external force such as vibration, sealing is maintained to increase waterproof performance and prevent penetration of foreign substances, and a sufficient insulating distance between high-voltage terminals is secured to prevent a short circuit from occurring, a device unit, and a power cutting-off system for use in an electric car and including the same.

Technical Solution

To achieve these objects, the present invention provides a service plug unit included in a power cutting-off system for selectively cutting off the supply of power to electric car, the service plug unit comprising a lever housing having an opening in a downward direction, a rotary lever coupled to the lever housing to be rotatable to a certain angle, and configured to attach the service plug unit to or detach the service plug unit from a device unit to supply battery power to the device unit or to cut off the supply of the battery power to the device unit, as the rotary lever is rotated, a terminal housing coupled to an inner side of the lever housing and into which a high-voltage terminal and an interlock terminal of the service plug unit are inserted, and a shielding member provided on an inner side of the lever housing and having a flat-plate type shielding part and a plurality of contacting parts extending from the shielding part in a vertical direction.

And the service plug unit may further comprise a guide slot formed in an inner side of the lever housing, and configured to place the plurality of contacting parts of the shielding member therein.

And the service plug unit may further comprise a guide protrusion protruding from a metal housing of the device unit in which the service plug unit is mounted and a slide guide having a curved shape, and configured to guide the guide protrusion to the rotary lever to vertically displace the service plug unit with respect to the device unit as the rotary lever is rotated.

And a radius of curvature of the slide guide may decrease toward an inner end portion thereof from an entrance portion.

And the service plug unit may further comprise a position determining protrusion formed on a side of the lever housing and a plurality of position determining holes formed in the rotary lever, and configured such that the position determining protrusion is placed in one of them as the rotary lever is rotated, whereby whether the high-voltage terminal and the interlock terminal of the service plug unit are connected or whether power is cut off is determined.

And three or more position determining holes may be formed, and the position determining protrusion may be placed in a position determining hole at one end as both the high-voltage terminal and the interlock terminal of the service plug unit are connected and thus power is supplied thereto.

And when both the high-voltage terminal and the interlock terminal of the service plug unit may be short-circuited and thus the supply of the power thereto is cut off, the position determining protrusion is placed in a position determining hole at an opposite end.

And when the high-voltage terminal is connected and the interlock terminal of the service plug unit is short-circuited, the position determining protrusion may be placed in a position determining hole except the position determining holes at the opposite ends.

And the slide guide may comprise a straight-line section to horizontally move the rotary lever such that the service plug unit is inserted into and fixed at a connection position.

And the service plug unit may further comprise a first stopper formed at one side of the rotary lever and a second stopper formed at one side of the lever housing, and configured to be engaged with the first stopper to fix the rotary lever when the service plug unit is mounted in the device unit.

And the service plug unit may further comprise a locking piece provided on the rotary lever, and configured to lock the first stopper not to be separated in a state in which the first stopper is engaged with the second stopper.

And the service plug unit may further comprise a service plug unit sealing member provided between the terminal housing and the lever housing.

And the interlock terminal of the service plug unit may be provided between the high-voltage terminals.

To achieve these objects, the present invention provides a device unit which is included in a power cutting-off system which is for use in an electric car to selectively cut off the supply of power to the electric car and in which a service plug unit is mounted to be attachable to and detachable from the device unit, the device unit comprising a metal housing fixedly coupled to a cover of the device unit and configured to mount the service plug unit therein and an insulating housing coupled to a bottom of the metal housing, including an insertion hole into which at least one flexible bus bar is inserted in a horizontal direction, and configured to mount an interlock terminal of the device unit therein.

And the device unit may further comprise a device unit sealing member interposed between the metal housing and the cover of the device unit.

And the device unit may further comprise a housing cover coupled to a bottom of the insulating housing, wherein the housing cover may comprise a separation preventing unit configured to prevent the interlock terminal of the device unit from being separated.

To achieve these objects, the present invention provides a power cutting-off system for an electric car comprising the service plug unit and the device unit.

Advantageous Effects

According to embodiments of the inventive concept, earthing can be maintained regardless of an external force due to various vibrations occurring during driving of an electric car, thereby stably maintaining shielding performance.

In a service plug unit, a device unit, and a power cutting-off system for use in an electric car and including the same according to the inventive concept, high-voltage power is cut off and a plug is separated at different times and thus sparks may be prevented from being generated due to high voltage when the plug is separated.

Furthermore, in a service plug unit, a device unit, and a power cutting-off system for use in an electric car and including the same according to the inventive concept, power may be prevented from being arbitrarily cut off due to unintended separation of a plug or a terminal, caused by an external force such as vibration or the like.

In addition, in a service plug unit, a device unit, and a power cutting-off system for use in an electric car and including the same according to the inventive concept, sealing may be maintained to improve waterproof performance and prevent penetration of foreign substances.

BEST MODE OF THE INVENTIVE CONCEPT

Figure 1:
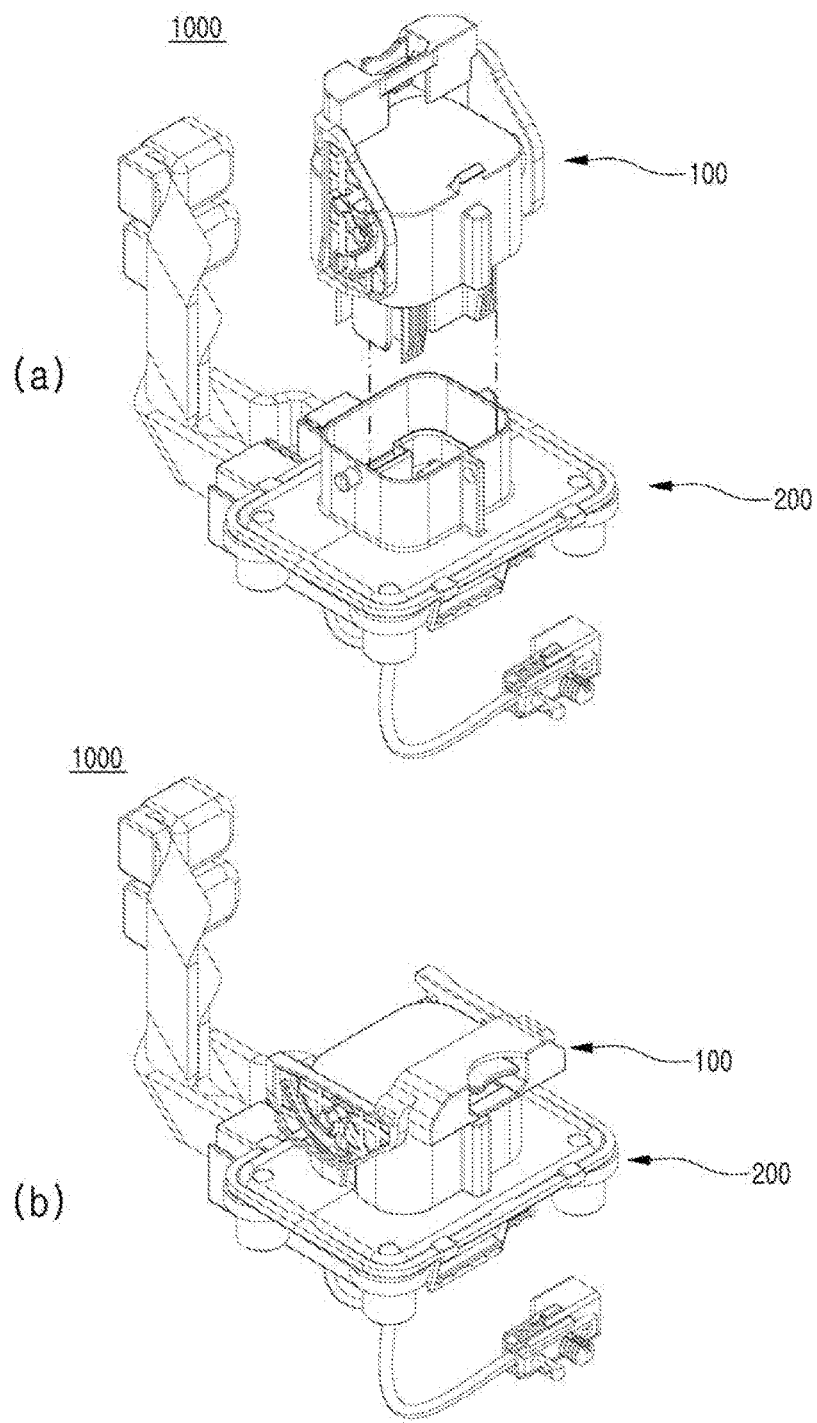
FIG. 1 is a perspective view of a state in which a service plug unit and a device unit of a power cutting-off system for an electric car according to one embodiment of the inventive concept are engaged with each other and a state in which they are separated from each other.

Hereinafter, exemplary embodiments of the inventive concept will be described in detail with reference to the accompanying drawings. However, the inventive concept is not limited to the embodiments set forth herein and may be embodied in many different forms. Rather, these embodiments are provided so that this disclosure will be thorough and complete and will fully convey the inventive concept to those of ordinary skill in the art. In the present disclosure, the same reference numerals denote the same elements.

Figure 2:
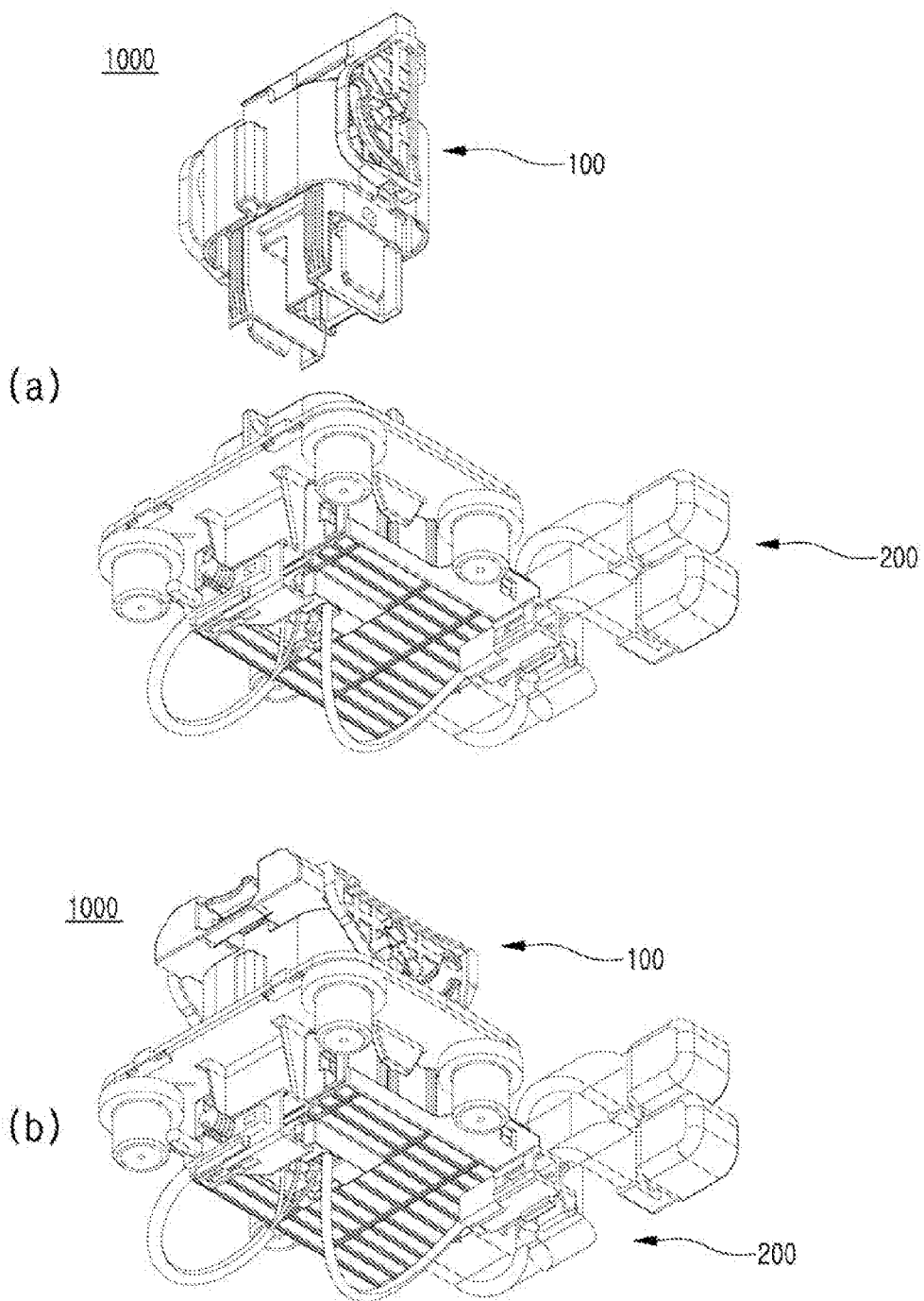
FIG. 2 is a perspective bottom view of a state in which a service plug unit and a device unit of a power cutting-off system for an electric car according to one embodiment of the inventive concept are engaged with each other and a state in which they are separated from each other.
Figure 3:
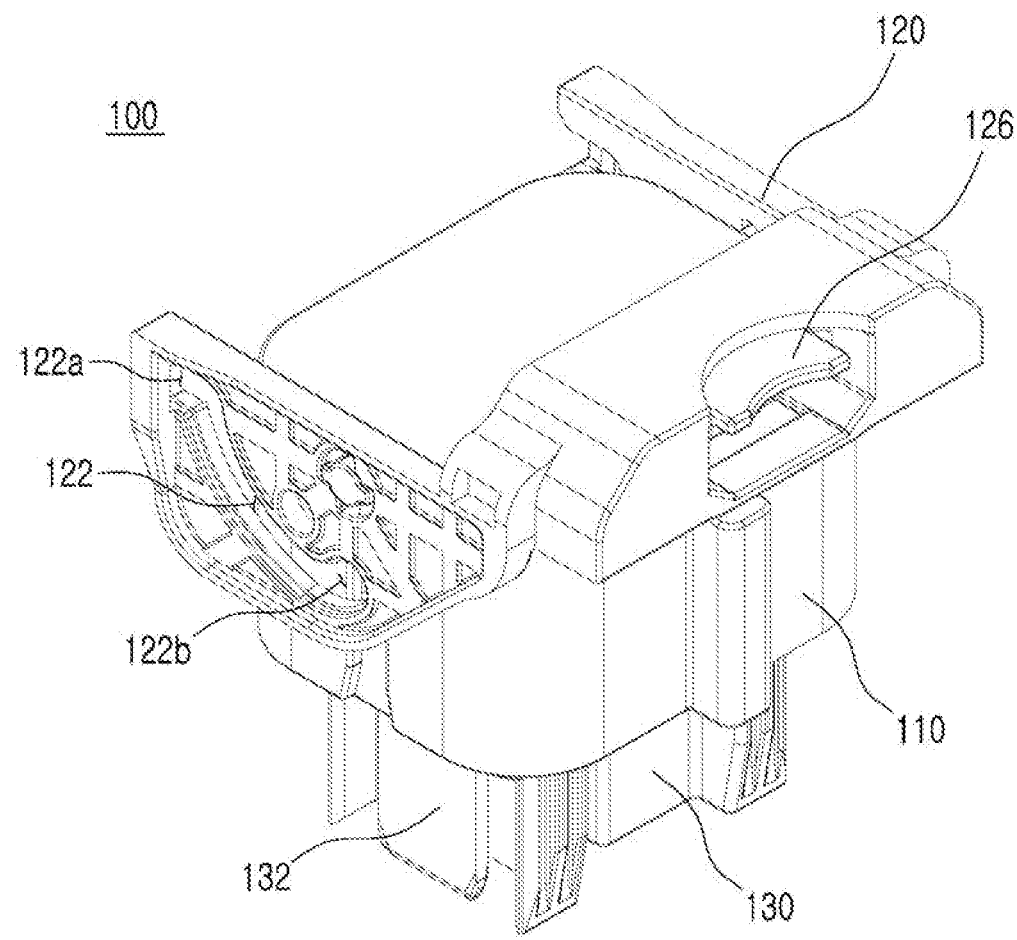
FIG. 3 is a perspective view of a service plug unit according to one embodiment of the inventive concept.
Figure 4:
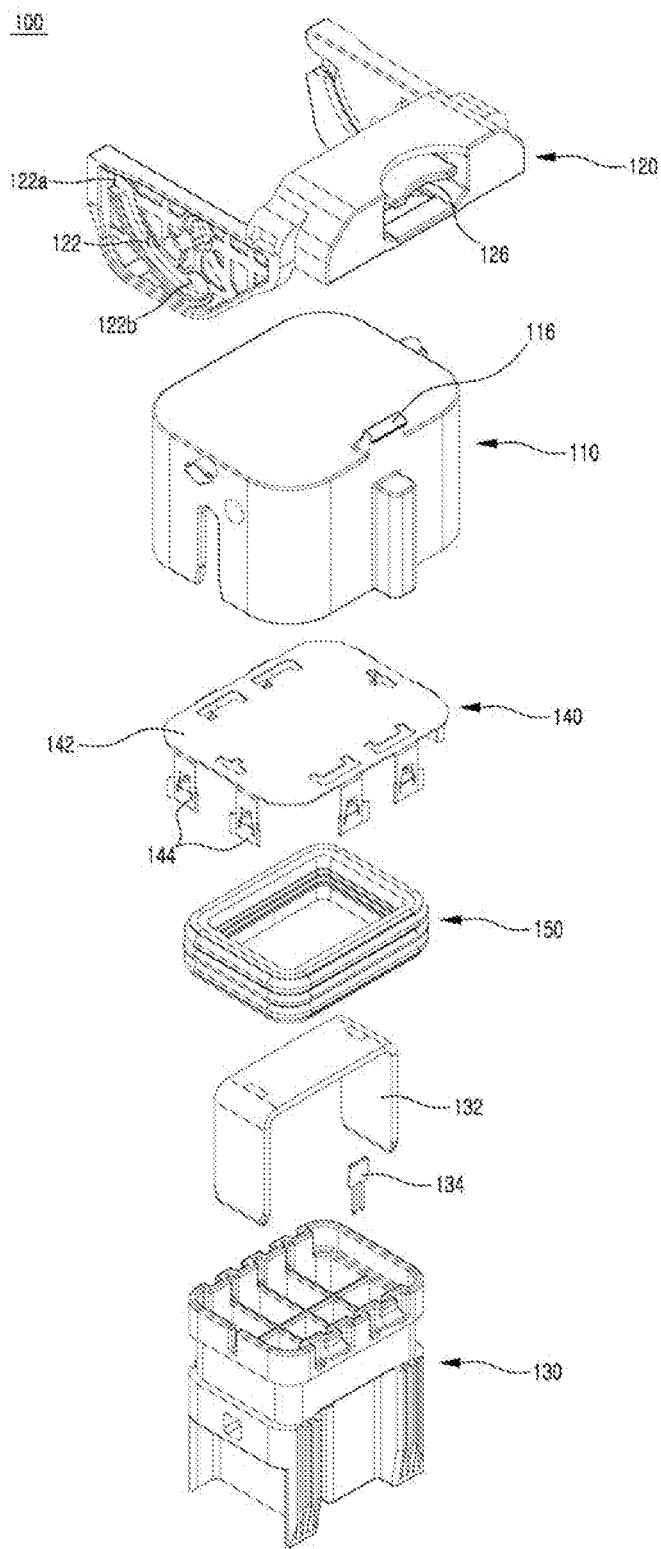
FIG. 4 is an exploded perspective view of a service plug unit according to one embodiment of the inventive concept.
Figure 5:
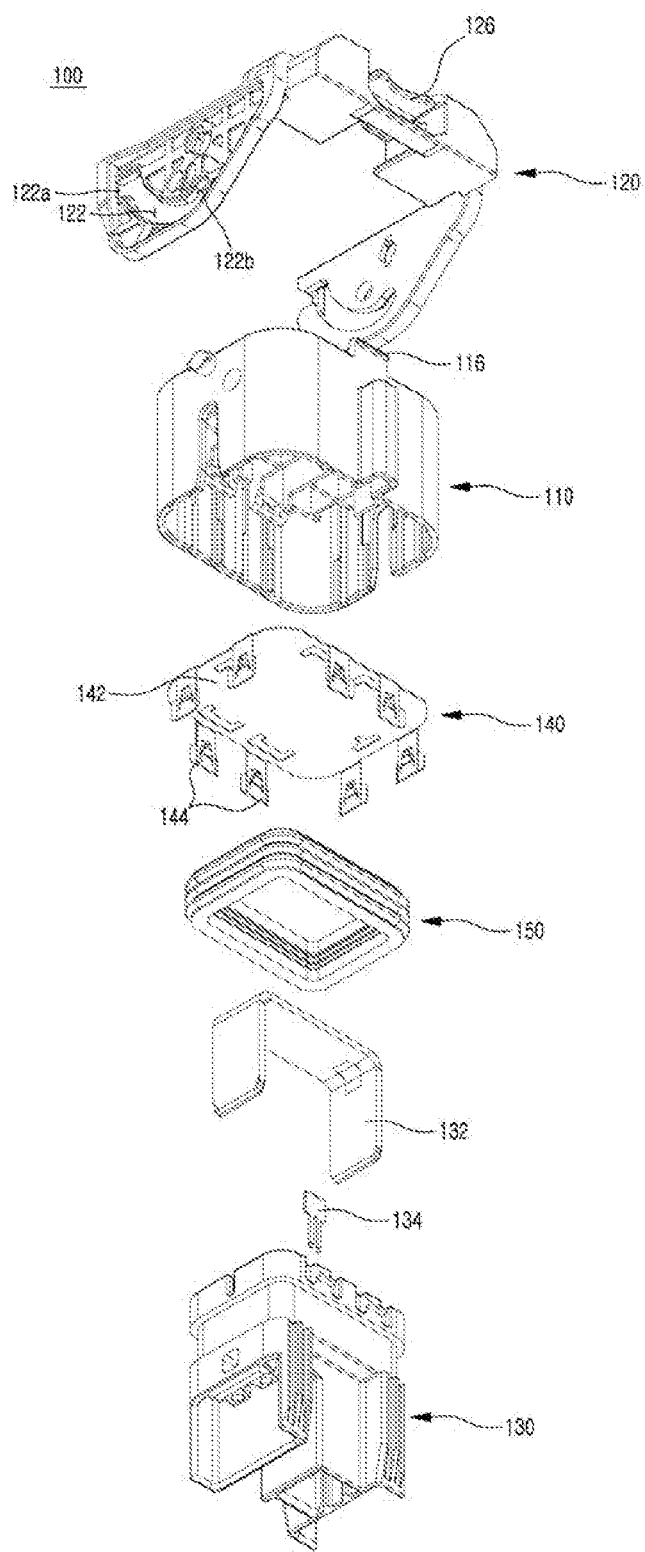
FIG. 5 is an exploded perspective bottom view of a service plug unit according to one embodiment of the inventive concept.
Figure 6:
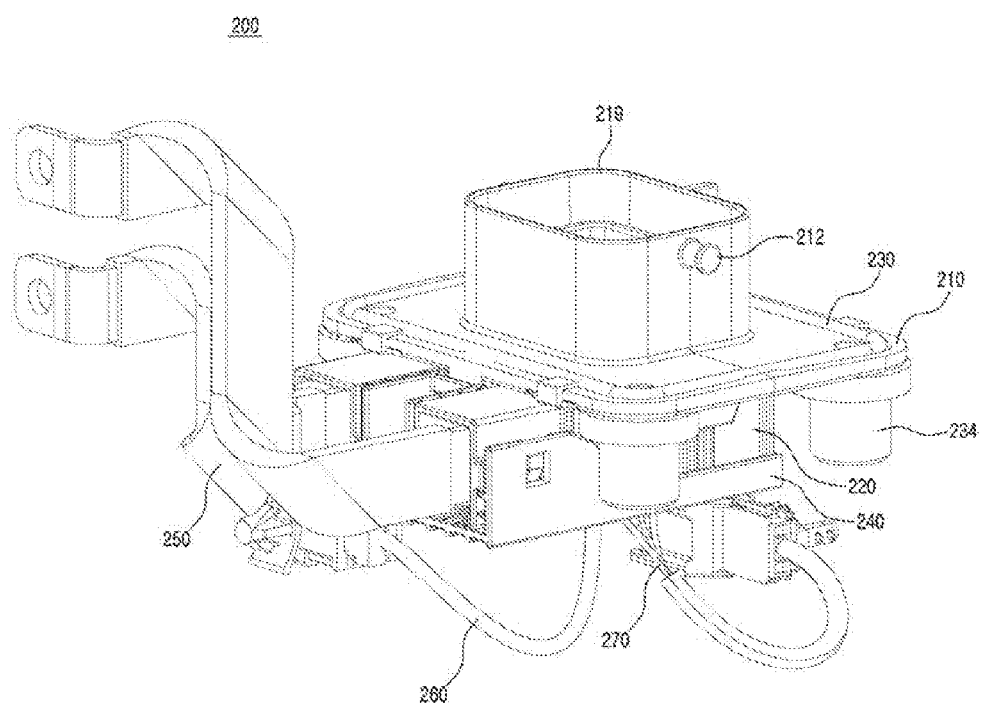
FIG. 6 is a perspective view of a device unit according to one embodiment of the inventive concept.
Figure 7:
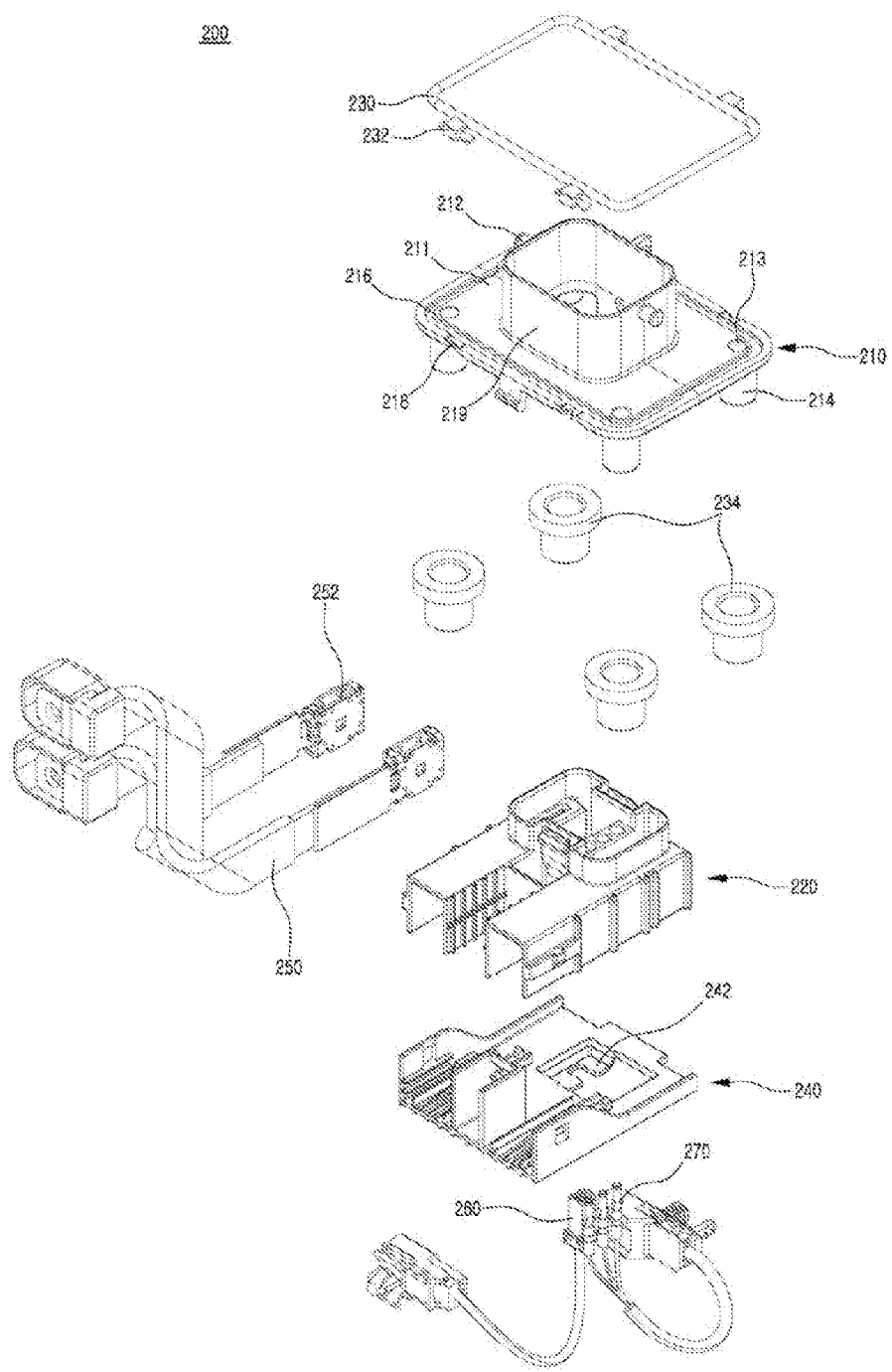
FIG. 7 is an exploded perspective view of a device unit according to one embodiment of the inventive concept.
Figure 8:
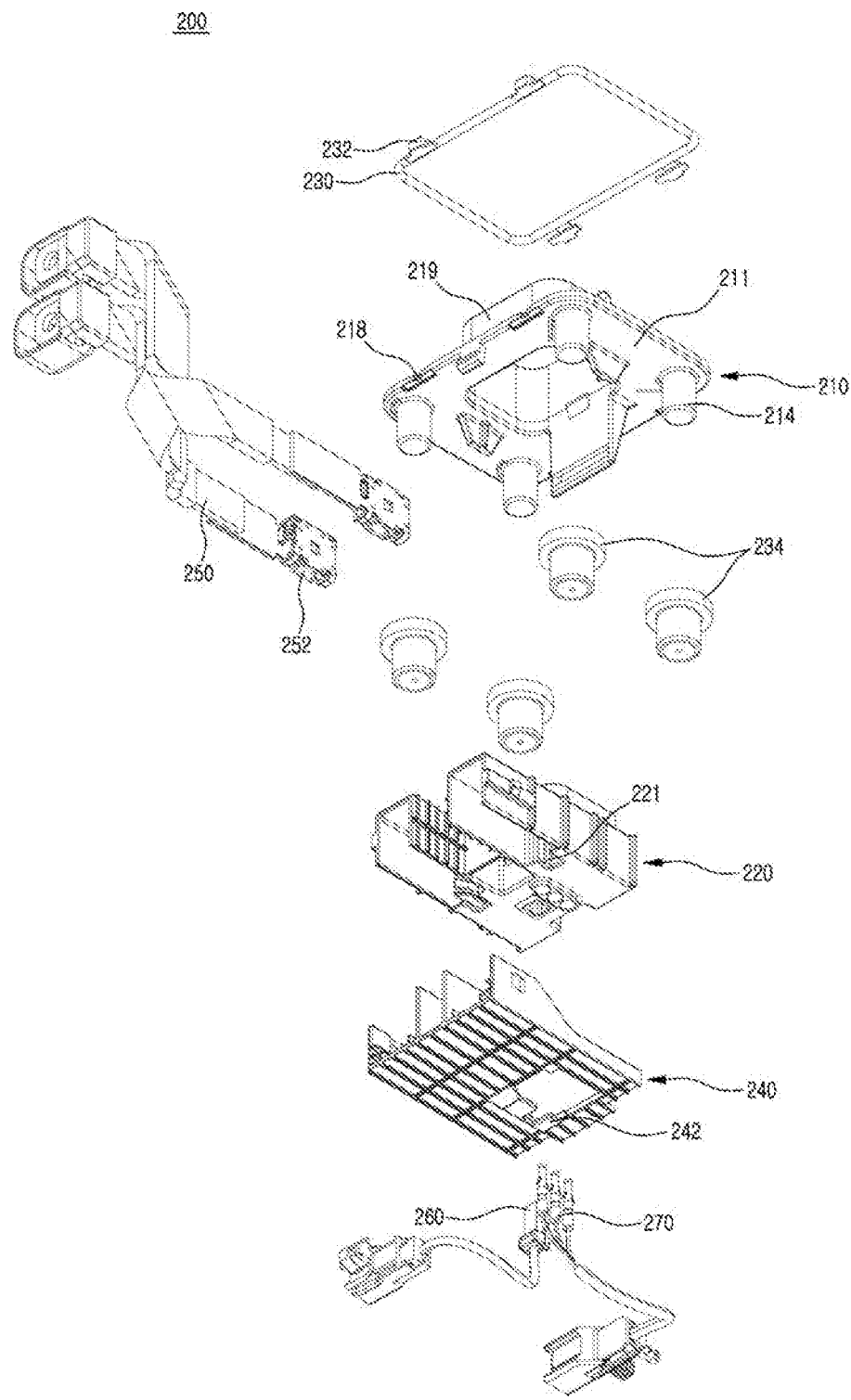
FIG. 8 is an exploded perspective bottom view of a device unit according to one embodiment of the inventive concept.

FIG. 1 is a perspective view of a state in which a service plug unit and a device unit of a power cutting-off system for an electric car according to one embodiment of the inventive concept are engaged with each other and a state in which they are separated from each other. FIG. 2 is a perspective bottom view of a state in which a service plug unit and a device unit of a power cutting-off system for an electric car according to one embodiment of the inventive concept are engaged with each other and a state in which they are separated from each other. FIG. 3 is a perspective view of a service plug unit according to one embodiment of the inventive concept. FIG. 4 is an exploded perspective view of a service plug unit according to one embodiment of the inventive concept. FIG. 5 is an exploded perspective bottom view of a service plug unit according to one embodiment of the inventive concept. FIG. 6 is a perspective view of a device unit according to one embodiment of the inventive concept. FIG. 7 is an exploded perspective view of a device unit according to one embodiment of the inventive concept. FIG. 8 is an exploded perspective bottom view of a device unit according to one embodiment of the inventive concept.

Referring to FIGS. 1 to 8, a power cutting-off system 1000 for an electric car according to one embodiment of the inventive concept may largely include a service plug unit 100 and a device unit 200.

The device unit 200 may be understood as a unit mounted in a battery pack cover (a battery-related structure or housing) of an electric car but is not limited thereto and may be any device to which the supply of current need be cut off by engaging the service plug unit 100 thereto or separating the service plug unit 100 therefrom. Hereinafter, for convenience of explanation, a unit mounted in a battery pack cover will be described as one example of the device unit 200.

The device unit 200 may be fixedly coupled to a cover (not shown) thereof, e.g., a battery cover or the like. Battery power may be supplied to the device unit 200 when the service plug unit 100 is mounted in the fixed device unit 200 and may be cut off when the service plug unit 100 is separated from the device unit 200.

Here, the service plug unit 100 may largely include a lever housing 110, a rotary lever 120, a terminal housing 130, a service plug unit sealing member 150, a shielding member 140, a high-voltage terminal 132, and an interlock terminal 134. The device unit 200 may largely include a metal housing 210, an insulating housing 220, a device unit sealing member 230, a housing cover 240, a flexible bus bar 250, an interlock terminal, and an isolation terminal.

The structures of the service plug unit 100 and the device unit 200 will be described in detail below. The service plug unit 100 includes the lever housing 110 forming the appearance thereof. The lever housing 110 may have a rectangular shape having an opening in a downward direction.

The rotary lever 120 may be rotatably coupled to one side of the lever housing 110. The rotary lever 120 is coupled to the lever housing 110 via a hinge such that the rotary lever 120 is rotatable to a predetermined angle. As the rotary lever 129 is rotated, the service plug unit 100 is mounted in or separated from the device unit 200 to supply battery power to the device unit 200 or cut off the supply of the battery power thereto.

In detail, the rotary lever 120 includes a slide guide 122 having a curved shape. As the rotary lever 120 is rotated, it is rotatably displaced with respect to a guide protrusion 212 fixedly formed on the metal housing 210 of the device unit 200 which is to be described below. Thus, the whole service plug unit 100 including the lever housing 110 coupled to the rotary lever 120 is vertically moved relative to the device unit 200 to be mounted in or separated from the device unit 200.

In this case, an entrance portion 122a which the guide protrusion 212 may enter is formed in one end portion of the slide guide 122. The guide protrusion 212 may enter the slide guide 122 via the entrance portion 122a in a state in which the rotary lever 120 is vertically erected.

As the rotary lever 120 is rotated downward in a state in which the guide protrusion 212 enters the entrance portion 122a, the fixedly formed guide protrusion 212 is guided along the slide guide 122 to insert the service plug unit 100 into the device unit 200.

In contrast, as the rotary lever 120 is lifted upward and rotated in a state in which the service plug unit 100 is mounted in the device unit 200, the fixedly formed guide protrusion 212 is guided along the slide guide 122 in an opposite direction to move the service plug unit 100 upward, thereby separating the guide protrusion 212 from the entrance portion 122a. Thus, the service plug unit 100 may be detached from the device unit 200 or the mounting of the service plug unit 100 in the device unit 200 may be canceled.

As a radius of curvature of the slide guide 122 decreases toward an inner end portion thereof from the entrance portion 122a, a radius of curvature of an opposite side (or the inner end portion) of the slide guide 122 is less than those of the other regions thereof. Thus, when all terminals are connected as the service plug unit 100 is fully inserted into the device unit 200, the guide protrusion 212 may be placed on the inner end portion having a smaller radius of curvature.

Thus, when the service plug unit 100 is connected to the device unit 200, the rotary lever 120 is not lifted upward unless a higher external force is applied thereto, thereby preventing the service plug unit 100 from being easily separated from the device unit 200.

The terminal housing 130 may be coupled to the lever housing 110 by being inserted in a direction of the opening of the lever housing 110. The high-voltage terminal 132 and the interlock terminal 134 of the service plug unit 100 are installed in the terminal housing 130 by being inserted into the terminal housing 130. When the service plug unit 100 is inserted into the device unit 200, the high-voltage terminal 132 and the interlock terminal 134 are respectively electrically connected to a high-voltage terminal and an interlock terminal of the device unit 200 and thus battery power is supplied.

Here, when the service plug unit 100 is mounted in the device unit 200, the high-voltage terminal 132 is connected earlier than the interlock terminal 134 of the service plug unit 100. After the service plug unit 100 is inserted more deeply into the device unit 200, the interlock terminal 134 of the service plug unit 100 is connected.

Only after the interlock terminal 134 of the plug service unit 100 is connected, battery power is supplied to the device unit 200. If only the high-voltage terminal 132 is connected and the interlock terminal 134 of the service plug unit 100 is separated, power is not supplied to the high-voltage terminal.

When the service plug unit 100 is separated from the device unit 200, the interlock terminal 134 of the service plug unit 100 is disconnected earlier than the high-voltage terminal 132. The high-voltage terminal 132 is disconnected after the service plug unit 100 is further moved for being separated.

The service plug unit sealing member 150 is provided on an outer circumference surface of the terminal housing 130 to seal a gap between the terminal housing 130 and the lever housing 110. When the gap between the terminal housing 130 and the lever housing 110 is sealed with the service plug unit sealing member 150, water or foreign substances may be prevented from penetrating the gap between the terminal housing 130 and the lever housing 110 and flowing into the device unit 200.

Although not shown, a middle housing (not shown) may be additionally provided between the terminal housing 130 and the lever housing 110. In this case, a sealing member may be provided between the terminal housing 130 and the middle housing and between the middle housing and the lever housing 110.

The device unit 200 includes the metal housing 210 formed of a metal material. The metal housing 210 is manufactured by forming a hole in a central portion of a base 211 formed of a rectangular flat plate and forming an insertion portion 219 around the hole to extend upward by a predetermined length. The service plug unit 100 may be inserted into the device unit 200 via the insertion portion 219 to be connected to the device unit 200.

The metal housing 210 is fixed on the cover of some device. The base 211 may be fixedly coupled to the cover of the device unit 200 in a state in which the insertion portion 219 is exposed to the outside by inserting the insertion portion 219 upward into a hole formed in the cover of the device unit 200 from below the hole.

In detail, the base 211 includes bolt holes 213 through which it is coupled to the cover of the device unit 200 using bolts. A bolt housing 214 is formed below the bolt holes 213 to pass through the cover of the device unit 200, so that bolts (not shown) inserted into the bolt holes 213 may be accommodated in the bolt housing 214.

If the bolt housing 214 is not provided, the bolts used to couple the base 211 to the cover of the device unit 200 may be exposed inside the device unit 200. If pointed ends of the bolts are exposed under high voltage, arc may occur due to the concentration of an electric field or the like and thus internal components of the device unit 200 may be broken or damaged.

Since the metal housing 210 includes the bolt housing 214 in the present embodiment, the bolts are accommodated in the bolt housing 214 without being exposed inside the device unit 200. Accordingly, arc may be prevented from occurring and safety may be secured even when interference or collision occurs by the internal components of the device unit 200 due to vibration.

An external side of the bolt housing 214 is covered with a bolt housing cover 234, thereby insulating the bolt housing 214 and protecting the bolt housing 214 from impact noise or damage thereto.

The device unit sealing member 230 may be provided between the metal housing 210 and the cover of the device unit 200 to prevent water and foreign substances from penetrating between the metal housing 210 and the cover of the device unit 200. The device unit sealing member 230 may be provided to be in contact with a top surface of the metal housing 210 and a bottom surface of the cover of the device unit 200 and be then compressed to perform a sealing function when the bolts are combined with the bolt holes 213.

In this case, the metal housing 210 may include a sealing member guide groove 216 in which the device unit sealing member 230 is placed. As illustrated in FIG. 7, the sealing member guide groove 216 is formed along the perimeter of the base 211 of the metal housing 210 to correspond to the shape of the device unit sealing member 230. Thus, when a product is assembled, the device unit sealing member 230 may be aligned to a right position on the base 211 by using the sealing member guide groove 216.

At least one fixing unit 232 may be formed on the device unit sealing member 230. The at least one fixing unit 232 may protrude toward the outside to fix the device unit sealing member 230 in a state in which the device unit sealing member 230 is placed in the sealing member guide groove 216.

A fixing-unit placing groove 218 is formed at a position corresponding to the at least one fixing unit 232 along the perimeter of the metal housing 210, in which the at least one fixing unit 232 may be placed. In this case, the fixing-unit placing groove 218 is formed to range from the top surface of the metal housing 210 to a bottom surface thereof. Since the at least one fixing unit 232 sequentially passes a top surface and a circumference of the base 211 of the metal housing 210 and is then screwed into a bottom surface of the base 211, the device unit sealing member 230 may be stably fixed on the right position.

The insulating housing 220 is coupled to the bottom of the metal housing 210. The flexible bus bar 250 is inserted into the insulating housing 220. The interlock terminal 260 of the device unit 200 is mounted in the insulating housing 220. The flexible bus bar 250 may be used for an electrical connection to an internal space of a complicated and narrow device to which a cable is not easily connected.

The flexible bus bar 250 may secure desired flexibility and thus does not require any additional component to prevent interference between components, and may be formed to a thickness less than that of a cable, thereby improving workability and space utilization.

The flexible bus bar 250 may be inserted in a horizontal direction of the insulating housing 220. The insulating housing 220 includes an insertion slot 221 (see FIGS. 8 and 14) into which the flexible bus bar 250 is inserted in the horizontal direction. Thus, the internal space of the device unit 200 may be more efficiently used, the flexible bus bar 250 may be more stably fixed, and a connection to the high-voltage terminal 132 may be more increased than when the flexible bus bar 250 is coupled to the insulating housing 220 from below the insulating housing 220.

A high-voltage connection terminal 252 is provided on an end portion of the flexible bus bar 250. The high-voltage connection terminal 252 inserted in a horizontal direction of the insulating housing 220 is located inside the insertion portion 219 and is thus exposed to the outside via an opening in the insertion portion 210.

As the service plug unit 100 is inserted into the insertion portion 219, the high-voltage terminal 132 is connected to the high-voltage connection terminal 252. That is, after the high-voltage connection terminal 252 is inserted in the horizontal direction, the high-voltage terminal 132 is vertically connected to the high-voltage connection terminal 252 from above the high-voltage connection terminal 252, thereby more stably connecting these terminals to each other.

A horizontal cross-section of the high-voltage connection terminal 252 provided on one end portion of the flexible bus bar 250 has a '⊏' shape and thus the high-voltage terminal 132 may be inserted and connected to the high-voltage connection terminal 252 such that the high-voltage terminal 132 is accommodated in the high-voltage connection terminal 252.

In this case, the interlock terminal 260 of the device unit 200 is inserted into the insulating housing 220 from below the insulating housing 220 such that an end portion of the interlock terminal 260 is exposed upward inside the insertion portion 219. Thus, as the service plug unit 100 is inserted into the insertion portion 219, the interlock terminal 134 of the service plug unit 100 may be connected to the interlock terminal 260 of the device unit 200.

An isolation terminal 270 is inserted into the insulating housing 220 from below the insulating housing 220. Accordingly, an end portion of the isolation terminal 270 is located at the insertion portion 219 and is thus exposed to the outside. The isolation terminal 270 is provided to measure insulating properties of all output circuits or coupling points of device and thus should be exposed to the outside.

The housing cover 240 is coupled to the bottom of the insulating housing 220. A separation preventing unit 242 may be formed on the housing cover 240 to prevent separation of the interlock terminal 260 of the device unit 200.

The separation preventing unit 242 may prevent the interlock terminal 260 of the device unit 200, which is connected to the insulating housing 220 from below the insulating housing 220, from being separated downward from the insulating housing 220 due to an external force such as vibration.

Figure 9:
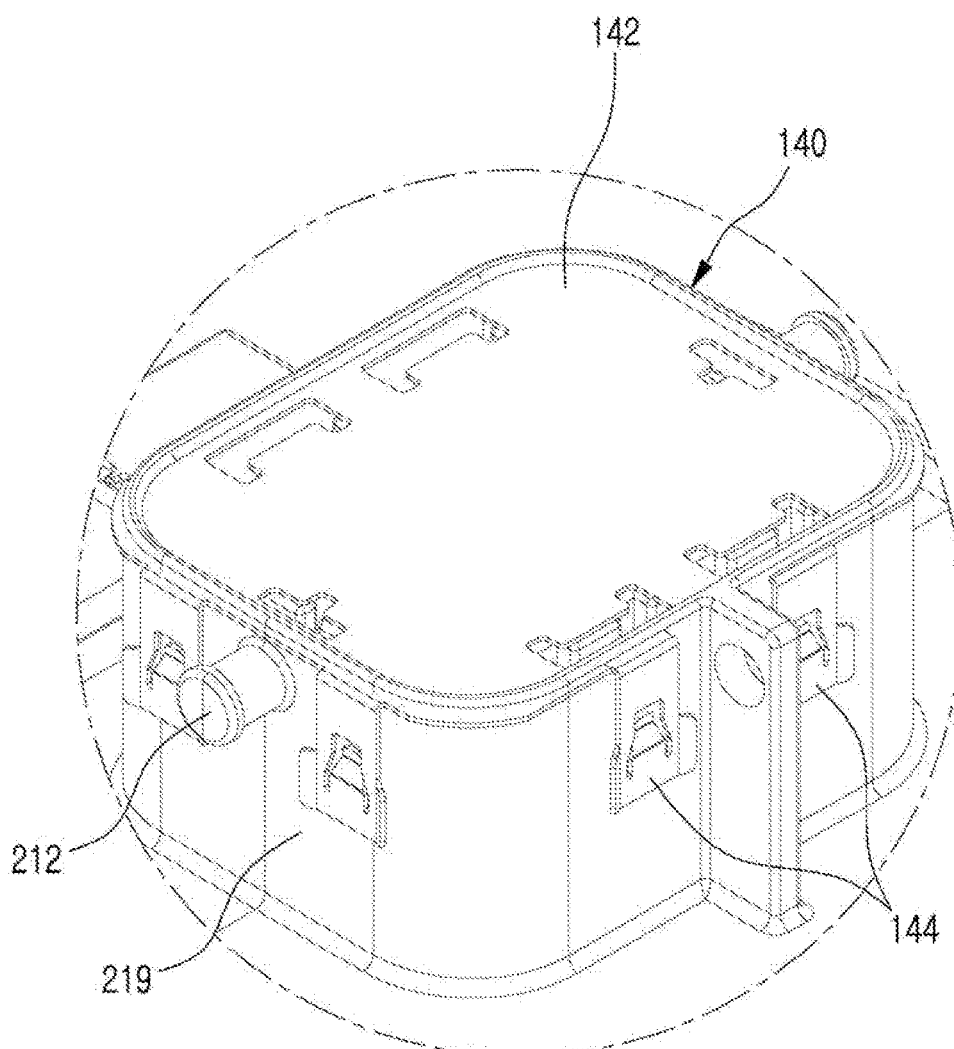
FIG. 9 is a partial perspective view of a structure in which a shielding member is in contact with a metal housing, according to an embodiment of the inventive concept.
Figure 10:
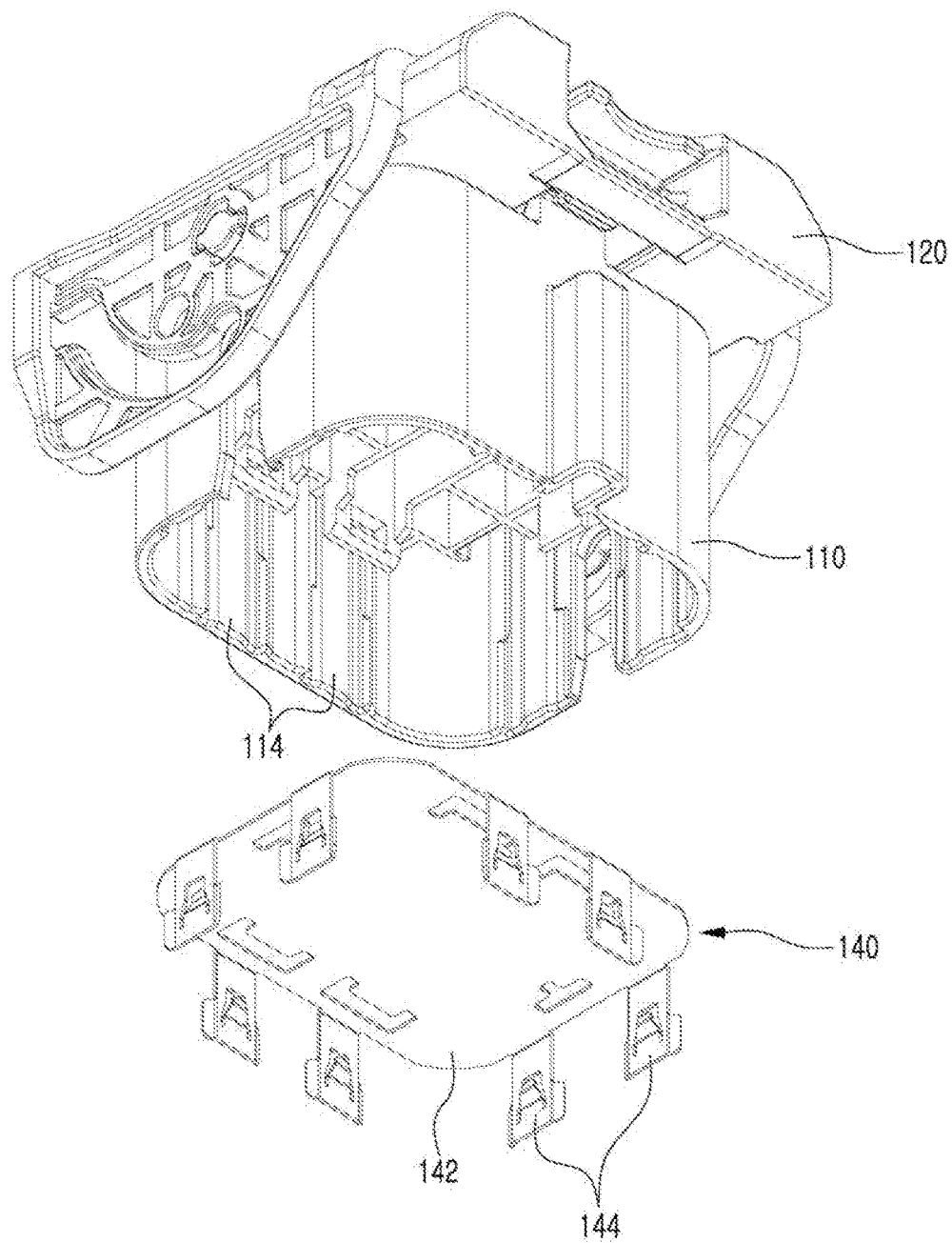
FIG. 10 is a partial exploded perspective view of a structure in which a shielding member is installed in a lever housing, according to an embodiment of the inventive concept.

FIG. 9 is a partial perspective view of a structure in which a shielding member is in contact with a metal housing, according to an embodiment of the inventive concept. FIG. 10 is a partial exploded perspective view of a structure in which a shielding member is mounted in a lever housing, according to an embodiment of the inventive concept.

Referring to FIGS. 1 to 10, the power cutting-off system 1000 for an electric car according to an embodiment of the inventive concept may further include the shielding member 140 including a shielding part 142 provided on an inner side of the lever housing 110 and having a flat plate shape and contacting parts 144 extending in a curved form vertically from the shielding part 142.

The shielding member 140 prevents electronic components of an electric car from being influenced by each other due to electromagnetic waves generated in a high-voltage circuit.

The shielding part 142 of the shielding member 140 may include a rectangular thin metal plate formed by press molding. The contacting parts 144 may extend downward from the shielding part 142. By providing the contacting parts 144, a contact failure may be prevented from occurring due to vibration of a vehicle and a plurality of contact points may be provided to achieve stable shielding performance. Furthermore, a compact shielding structure may be achieved by forming the shielding member 140 including the flat-plate type shielding part 142 and the contacting parts 144.

As illustrated in the drawings, two contacting parts 144 may be formed at each side of the shielding part 142, i.e., a total of eight contacting parts 144 may be formed. However, the inventive concept is not limited thereto and may be embodied in many different forms.

As illustrated in FIG. 9, in the shielding member 140, when the service plug unit 100 is connected to the device unit 200, the contacting parts 144 are in contact with the metal housing 210 and the shielding part 142 covers an upper open region of the insertion portion 219. Thus, the top of the high-voltage terminal 132 and the top of the interlock terminal 134 of the service plug unit 100 are shielded by the shielding member 140.

As illustrated in FIG. 10, a guide slot 114 may be provided in an inner side of the lever housing 110, in which the contacting parts 144 may be placed. If the contacting parts 144 are placed in the guide slot 114, the contacting parts 144 may be prevented from being bent or squashed when the service plug unit 100 is inserted, and normal contact thereof with the metal housing 210 may be guaranteed, thereby increasing shielding safety.

Figure 11:
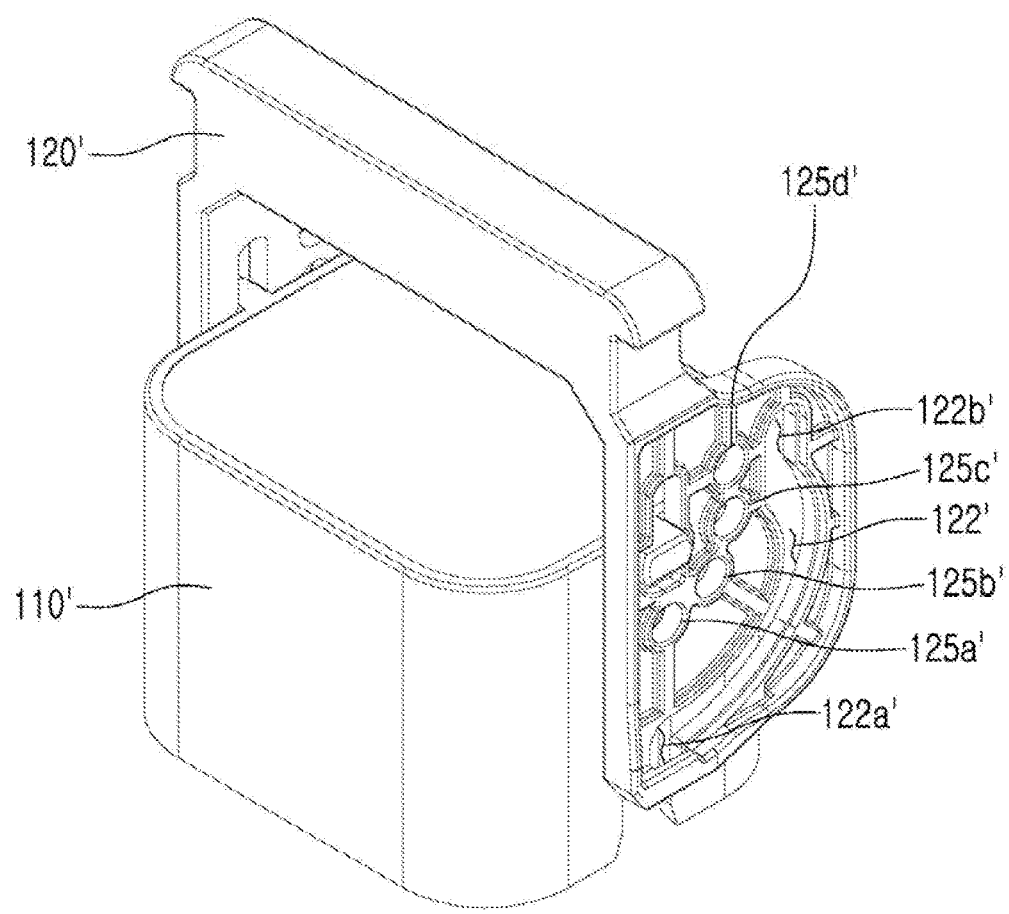
FIG. 11 is a partial perspective view of position determining holes formed in a rotary lever according to one embodiment of the inventive concept.
Figure 12:
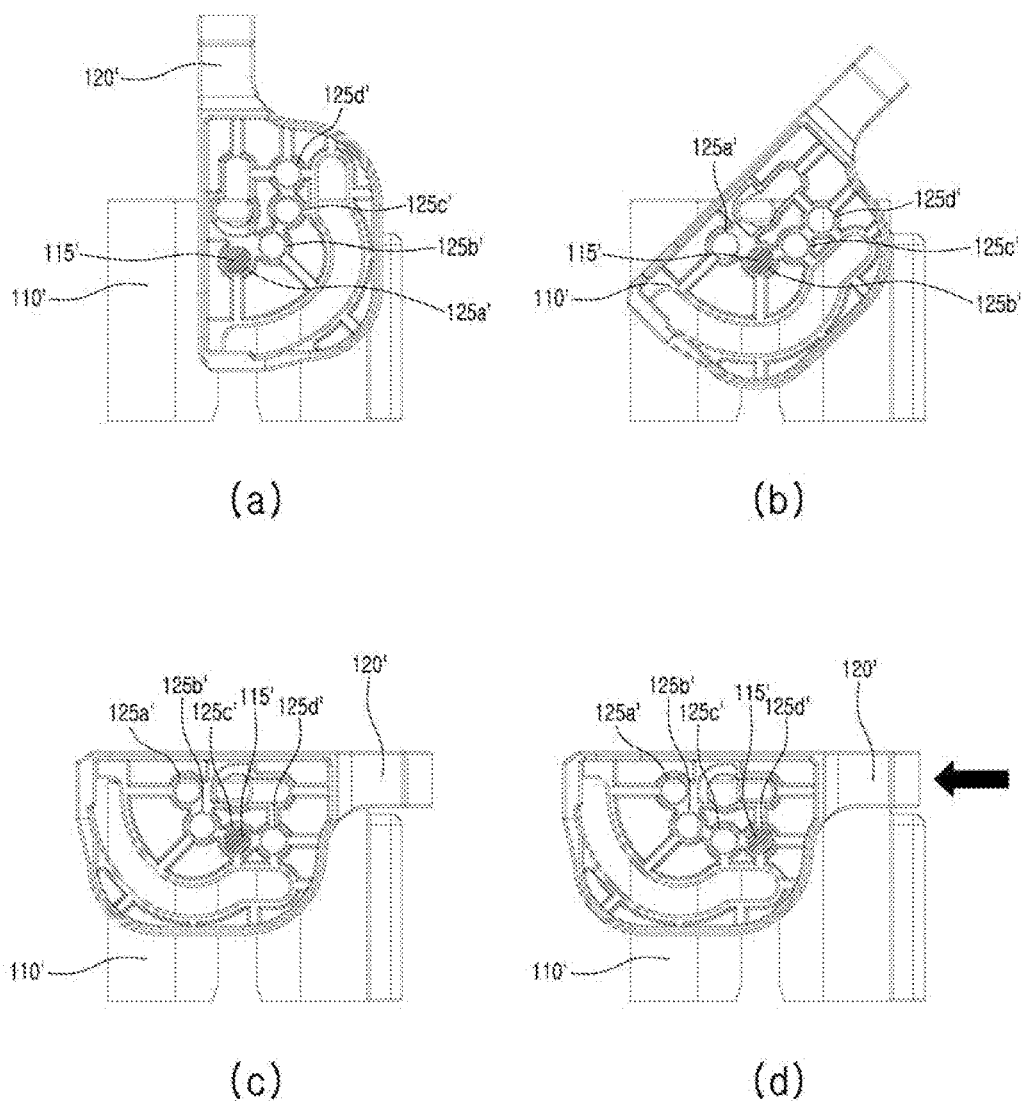
FIG. 12 is a diagram illustrating the structure and operation of position determining holes according to one embodiment of the inventive concept.

FIG. 11 is a partial perspective view of position determining holes formed in a rotary lever according to one embodiment of the inventive concept. FIG. 12 is a diagram illustrating the structure and operation of position determining holes according to one embodiment of the inventive concept.

Referring to FIGS. 1 to 12, in the power cutting-off system 1000 for an electric car according to one embodiment of the inventive concept, a position determining protrusion 115' may be fixedly formed on an outer side of a lever housing 110' and position determining holes 125a', 125b', 125c', and 125d' may be formed in a rotary lever 120' to correspond to the position determining protrusion 115'.

The position determining protrusion 115' is placed in the position determining hole 125a', 125b', 125c', or 125d' as the rotary lever 120' is rotated. Thus, whether the high-voltage terminal 132 and the interlock terminal 134 of the service plug unit 100 are connected to each other or whether power is cut off may be easily determined according to a rotational position of the rotary lever 120'.

In detail, three or more position determining holes may be formed. In FIGS. 11 and 12, embodiments in which the four position determining holes 125a', 125b', 125c', and 125d' are formed are illustrated.

FIG. 12(a) illustrates a state in which the rotary lever 120' is vertically erected. In this case, both the high-voltage terminal 132 and the interlock terminal 134 of the service plug unit 100 are short-circuited and power is cut off, and the position determining protrusion 115' is placed in the position determining hole 125a' at one end, i.e., the first position determining hole 125a'.

FIG. 12(b) illustrates a process of rotating the rotary lever 120' by an operator. In this case, the high-voltage terminal 132 may be connected to the high-voltage connection terminal 252 of the flexible bus bar 250, and the interlock terminal 134 of the service plug unit 100 may be short-circuited without being connected to the interlock terminal 260 of the device unit 200. In this state, the position determining protrusion 115' is placed in the second position determining hole 125b'.

A point of time when the interlock terminal 134 is separated and the position of the hole 125a', 125b', 125c', or 125d' may be set to correspond to each other so that an operator may physically sense the point of time when the interlock terminal 134 is separated and a time-delay effect or the like may be achieved through engagement of the hole 125a', 125b', 125c', or 125d' with the position determining protrusion 115'.

If the high-voltage terminal 132 is separated in a state in which power is supplied, sparks may occur to cause problems to occur. Thus, the interlock terminal 134 of the service plug unit 100 may be separated to cancel the supply of high-voltage power before the separation of the high-voltage terminal 132 and then the high-voltage terminal 132 may be separated, thereby preventing sparks from occurring.

FIG. 12(c) illustrates a state in which the rotary lever 120' is completely rotated downward. In this case, both the high-voltage terminal 132 and the interlock terminal 134 of the service plug unit 100 are connected to supply power thereto and the position determining protrusion 115' is placed in the position determining hole 125c' at an opposite end, i.e., the third position determining hole 125c'.

A state in which the position determining protrusion 115' is placed in the position determining hole 125c' at the opposite end, i.e., the third position determining hole 125c', may be a state in which both the high-voltage terminal and the interlock terminal 134 are connected to supply power thereto.

The position determining holes 125a', 125b', and 125c' described above are configured to perform a time-delay function to prevent the service plug unit 100 from being quickly separated from the device unit 200 and to separate the high-voltage terminal 132 a certain time after separation of the interlock terminal 134 of the service plug unit 100, thereby preventing sparks and safety accidents from occurring.

In order to cut off the supply of power to an electric car, an operator may perform the above processes in a reverse order. In order to supply power to the electric car, connecting the high-voltage terminal 132 and the interlock terminal 134 of the service plug unit 100, connecting the high-voltage terminal 132 and short-circuiting the interlock terminal 134 of the service plug unit 100, and short-circuiting both the high-voltage terminal 132 and the interlock terminal 134 of the service plug unit 100 are performed in a reverse order.

Thus, the position determining protrusion 115' is sequentially placed in the third position determining hole 125c', the second position determining hole 125b', and the first position determining hole 125a'.

As illustrated in FIGS. 11 and 12, the slide guide 122 may include a straight-line section 122b' in which the rotary lever 120' is moved in a parallel direction in a state in which the service plug unit 100 is connected to the device unit 200. The straight-line section 122b' prevents the service plug unit 100 from being arbitrarily separated from the device unit 200 due to vibration during driving of an electric car after the service plug unit 100 is connected to the device unit 200, thereby preventing an unintended power cut-off.

That is, when the rotary lever 120' is pushed in a left direction in the state of FIG. 12 (c), the position determining protrusion 115' is pushed to the straight-line section 122b' of the slide guide as illustrated in FIG. 12 (d). Similarly, a hinge axis on an outer side of the lever housing 110' is moved to a straight-line section of a hinge hole and may not be capable of being rotated, thereby preventing the lever housing 110' from being easily loosened.

Figure 13:
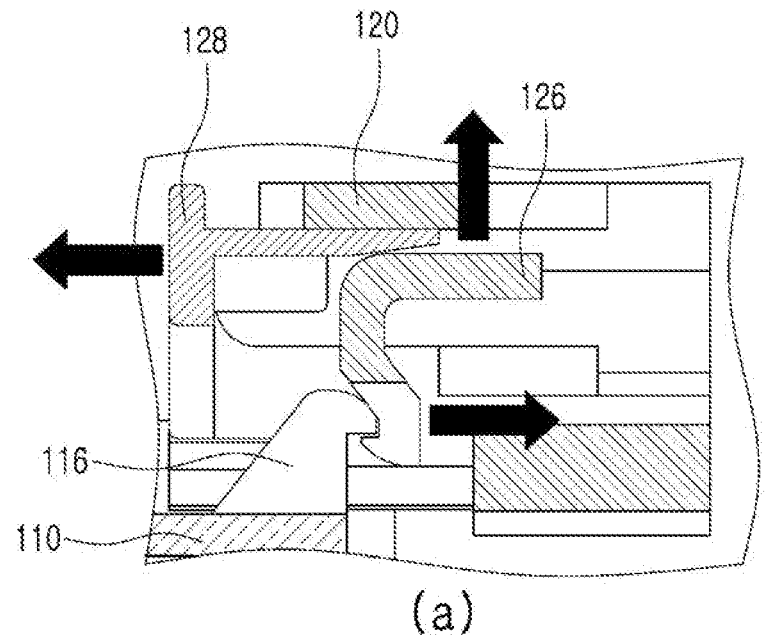
FIG. 13 is a diagram illustrating the structures and operating states of a first stopper, a second stopper, and a locking piece according to one embodiment of the inventive concept.
Figure 13:
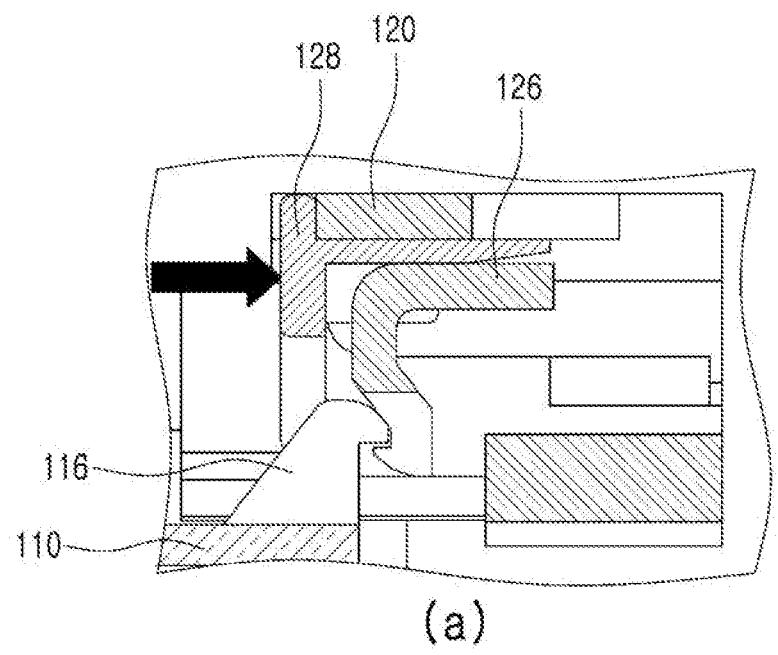

FIG. 13 is a diagram illustrating the structures and operation of a first stopper 126, a second stopper 116, and a locking piece 128 according to one embodiment of the inventive concept.

Referring to FIG. 13, the power cutting-off system 1000 for an electric car according to one embodiment of the inventive concept may include the first stopper 126 formed at one side of a rotary lever 120, and the second stopper 116 formed at one side of the lever housing 110 and engaged with the first stopper 126 to fix the rotary lever 120 when the service plug unit 100 is connected to the device unit 200.

The power cutting-off system 1000 may further include the locking piece 128 for locking the first stopper 126 not to be separated in a state in which the first stopper 126 is engaged with the second stopper 116. The locking piece 128 is not moved even when an operator presses the first stopper 126 in a state in which the locking piece 128 is moved to a locked position, and thus the rotary lever 120 cannot be lifted.

The structures of the first stopper 126, the second stopper 116, and the locking piece 128 may also prevent an unintended movement of the rotary lever 120, so that the service plug unit 100 may not be arbitrarily separated due to an external force such as vibration or an operator's mistake.

Figure 14:
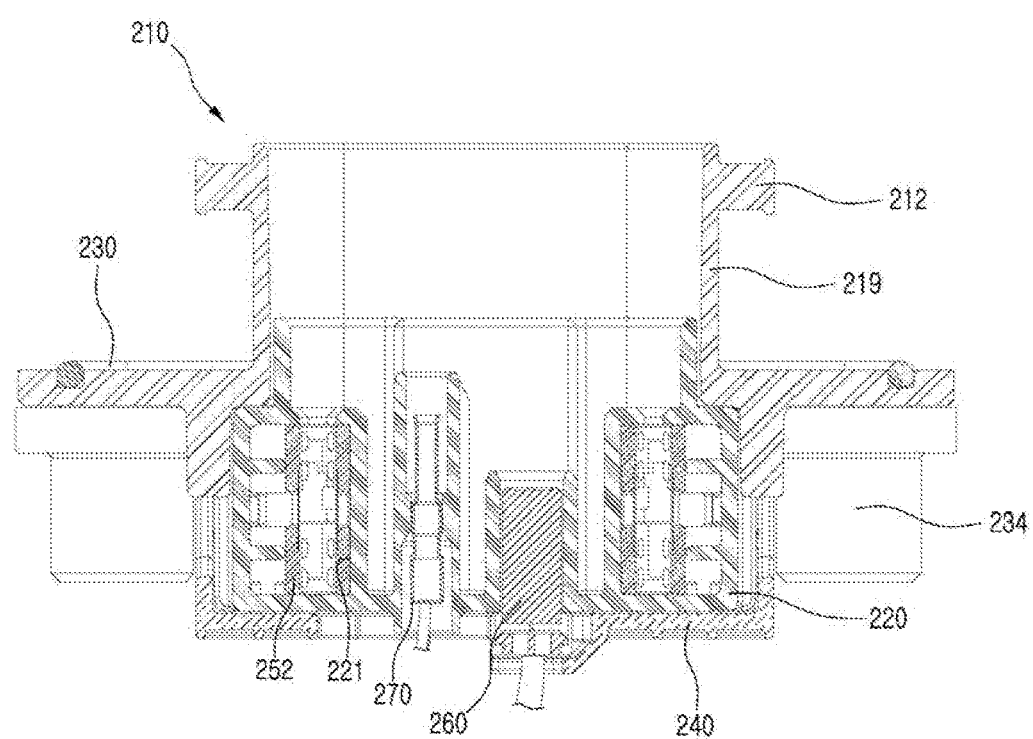
FIG. 14 is a partial cross-sectional view of an arrangement of a high-voltage terminal, an interlock terminal, and an isolation terminal according to one embodiment of the inventive concept.

FIG. 14 is a partial cross-sectional view of an arrangement of a high-voltage terminal, an interlock terminal, and an isolation terminal according to one embodiment of the inventive concept.

As illustrated in FIG. 14, in the power cutting-off system 1000 for an electric car according to one embodiment of the inventive concept, the interlock terminal 134 of the service plug unit 100 and an isolation terminal 270 may be provided on the high-voltage terminal 132.

By arranging these terminals as described above, they may be provided below the shielding member 140 to effectively shield electromagnetic waves or the like. Furthermore, the interlock terminal 134 and the isolation terminal 270 may be arranged on the high-voltage terminal 132 to be spaced from each other, so that the distance therebetween in a horizontal direction may be maximized and a spatial distance and an insulation distance in the high-voltage terminal 132 may be secured as much as possible. Accordingly, a short circuit may be prevented from occurring and safety and reliability may be increased.

In the power cutting-off system for an electric car according to the inventive concept described above, earthing may be maintained regardless of an external force caused by various vibrations generated during driving of an electric car and thus shielding performance may be stably maintained. Furthermore, high-voltage power is cut off and a plug is separated at different times to prevent sparks from occurring due to high voltage when the plug is separated. In addition, an unintended power cut-off may be prevented from occurring due to separation of the plug or a terminal caused by an external force such as vibration.

Furthermore, sealing may be maintained to increase waterproof performance and prevent penetration of foreign substances, and a sufficient insulating distance between high-voltage terminals may be secured, thereby preventing a short circuit from occurring.

While the inventive concept has been particularly shown and described with reference to exemplary embodiments thereof, it will be understood that various changes in form and details may be made therein without departing from the spirit and scope of the following claims. Therefore, when modified embodiments basically include the elements set forth in the claims of the inventive concept, they should be understood to be within the technical scope of the inventive concept.

The invention claimed is:

1. A service plug unit included in a power cutting-off system for selectively cutting off the supply of power to electric car, the service plug unit comprising:
    a lever housing having an opening in a downward direction;
    a rotary lever coupled to the lever housing to be rotatable to a certain angle, and configured to attach the service plug unit to or detach the service plug unit from a device unit to supply battery power to the device unit or to cut off the supply of the battery power to the device unit, as the rotary lever is rotated;

a terminal housing coupled to an inner side of the lever housing and into which a high-voltage terminal and an interlock terminal of the service plug unit are inserted;

a shielding member provided on an inner side of the lever housing and having a flat-plate type shielding part and a plurality of contacting parts extending from the shielding part in a vertical direction;

a position determining protrusion formed on a side of the lever housing; and a plurality of position determining holes formed in the rotary lever, and configured such that the position determining protrusion is placed in one of the plurality of position determining holes as the rotary lever is rotated, whereby whether the high-voltage terminal and the interlock terminal of the service plug unit are connected or whether power is cut off is determined.

2. The service plug unit of claim 1, further comprising a guide slot formed in an inner side of the lever housing, and configured to place the plurality of contacting parts of the shielding member therein.

3. The service plug unit of claim 1, further comprising:
a guide protrusion protruding from a metal housing of the device unit in which the service plug unit is mounted; and
a slide guide having a curved shape, and configured to guide the guide protrusion to the rotary lever to vertically displace the service plug unit with respect to the device unit as the rotary lever is rotated.

4. The service plug unit of claim 3, wherein a radius of curvature of the slide guide decreases toward an inner end portion thereof from an entrance portion.

5. The service plug unit of claim 1, wherein three or more position determining holes are formed, and the position determining protrusion is placed in a position determining hole at one end as both the high-voltage terminal and the interlock terminal of the service plug unit are connected and thus power is supplied thereto.

6. The service plug unit of claim 5, wherein, when both the high-voltage terminal and the interlock terminal of the service plug unit are short-circuited and thus the supply of the power thereto is cut off, the position determining protrusion is placed in a position determining hole at an opposite end.

7. The service plug unit of claim 6, wherein, when the high-voltage terminal is connected and the interlock terminal of the service plug unit is short-circuited, the position determining protrusion is placed in a position determining hole except the position determining holes at the opposite ends.

8. The service plug unit of claim 3, wherein the slide guide comprises a straight-line section to horizontally move the rotary lever such that the service plug unit is inserted into and fixed at a connection position.

9. The service plug unit of claim 1, further comprising:
a first stopper formed at one side of the rotary lever; and
a second stopper formed at one side of the lever housing, and configured to be engaged with the first stopper to fix the rotary lever when the service plug unit is mounted in the device unit.

10. The service plug unit of claim 9, further comprising a locking piece provided on the rotary lever, and configured to lock the first stopper not to be separated in a state in which the first stopper is engaged with the second stopper.

11. The service plug unit of claim 1, further comprising a service plug unit sealing member provided between the terminal housing and the lever housing.

12. The service plug unit of claim 1, wherein the interlock terminal of the service plug unit is provided between the high-voltage terminals.

13. A power cutting-off system for an electric car, comprising:
a service plug unit comprising:
a lever housing having an opening in a downward direction;
a rotary lever coupled to the lever housing to be rotatable to a certain angle, and configured to attach the service plug unit to or detach the service plug unit from a device unit to supply battery power to the device unit or to cut off the supply of the battery power to the device unit, as the rotary lever is rotated;
a terminal housing coupled to an inner side of the lever housing and into which a high-voltage terminal and an interlock terminal of the service plug unit are inserted;
a shielding member provided on an inner side of the lever housing and having a flat-plate type shielding part and a plurality of contacting parts extending from the shielding part in a vertical direction;
a position determining protrusion formed on a side of the lever housing; and
a plurality of position determining holes formed in the rotary lever, and configured such that the position determining protrusion is placed in one of the plurality of position determining holes as the rotary lever is rotated, whereby whether the high-voltage terminal and the interlock terminal of the service plug unit are connected or whether power is cut off is determined; and
a device unit which is included in the power cutting-off system which is for use in the electric car to selectively cut off the supply of power to the electric car and in which the service plug unit is mounted to be attachable to and detachable from the device unit, the device unit comprising:
a metal housing fixedly coupled to a cover of the device unit and configured to mount the service plug unit therein; and
an insulating housing coupled to a bottom of the metal housing, including an insertion hole into which at least one flexible bus bar is inserted in a horizontal direction, and configured to mount an interlock terminal of the device unit therein.

* * * * *